United States Patent [19]

Williams, Sr.

[11] 4,255,872
[45] Mar. 17, 1981

[54] AUDIOVISUAL INTERVIEW PORTFOLIO

[76] Inventor: Eugene Williams, Sr., 5717 Farm Pond Lane, Columbia, Md. 21045

[21] Appl. No.: 25,045

[22] Filed: Mar. 29, 1979

[51] Int. Cl.³ .............................. G09B 1/02; A45C A45C 3/02; B42D 1/06; B65D 85/672
[52] U.S. Cl. .................................. 434/308; 190/51; 206/232; 206/373; 206/387; 206/456; 206/576; 281/31; 220/339; 281/30
[58] Field of Search .............. 35/1, 8 R, 8 A; 281/30, 281/31; 283/46; 206/232, 373, 387, 456, 576; 220/339; 190/51; 150/35

[56] References Cited

U.S. PATENT DOCUMENTS

| | | | |
|---|---|---|---|
| 1,729,518 | 9/1929 | Newman | 281/31 |
| 3,376,962 | 4/1968 | Adams | 190/51 |
| 3,641,684 | 2/1972 | Paige | 35/8 A |
| 3,831,805 | 8/1974 | Yonce | 206/373 X |
| 3,896,929 | 7/1975 | Mills | 206/387 |
| 4,002,355 | 1/1977 | Sendor | 281/31 X |

FOREIGN PATENT DOCUMENTS

| | | | |
|---|---|---|---|
| 1561960 | 2/1969 | France | 190/51 |
| 2305923 | 10/1976 | France | 206/387 |

Primary Examiner—Joseph Scovronek
Attorney, Agent, or Firm—B. P. Fishburne, Jr.

[57] ABSTRACT

An interview or demonstration portfolio for prospective teachers and other professionals includes audiovisual components, demonstration slides and writings to highlight the competencies and performance skills of a candidate.

2 Claims, 3 Drawing Figures

U.S. Patent     Mar. 17, 1981     4,255,872
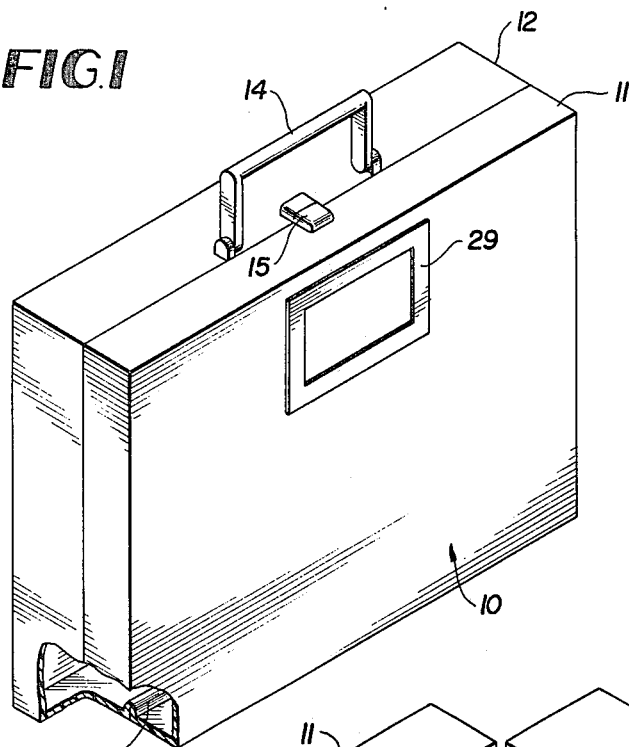
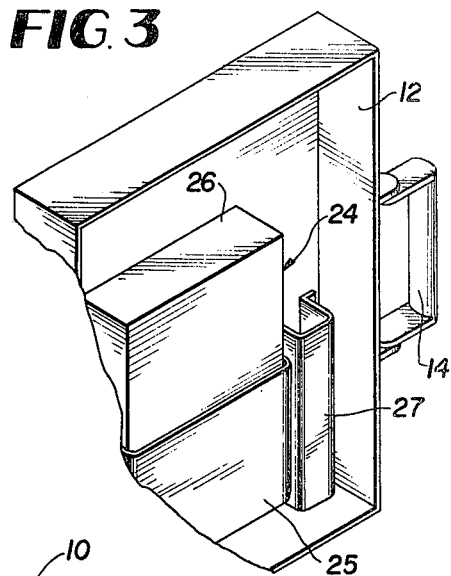
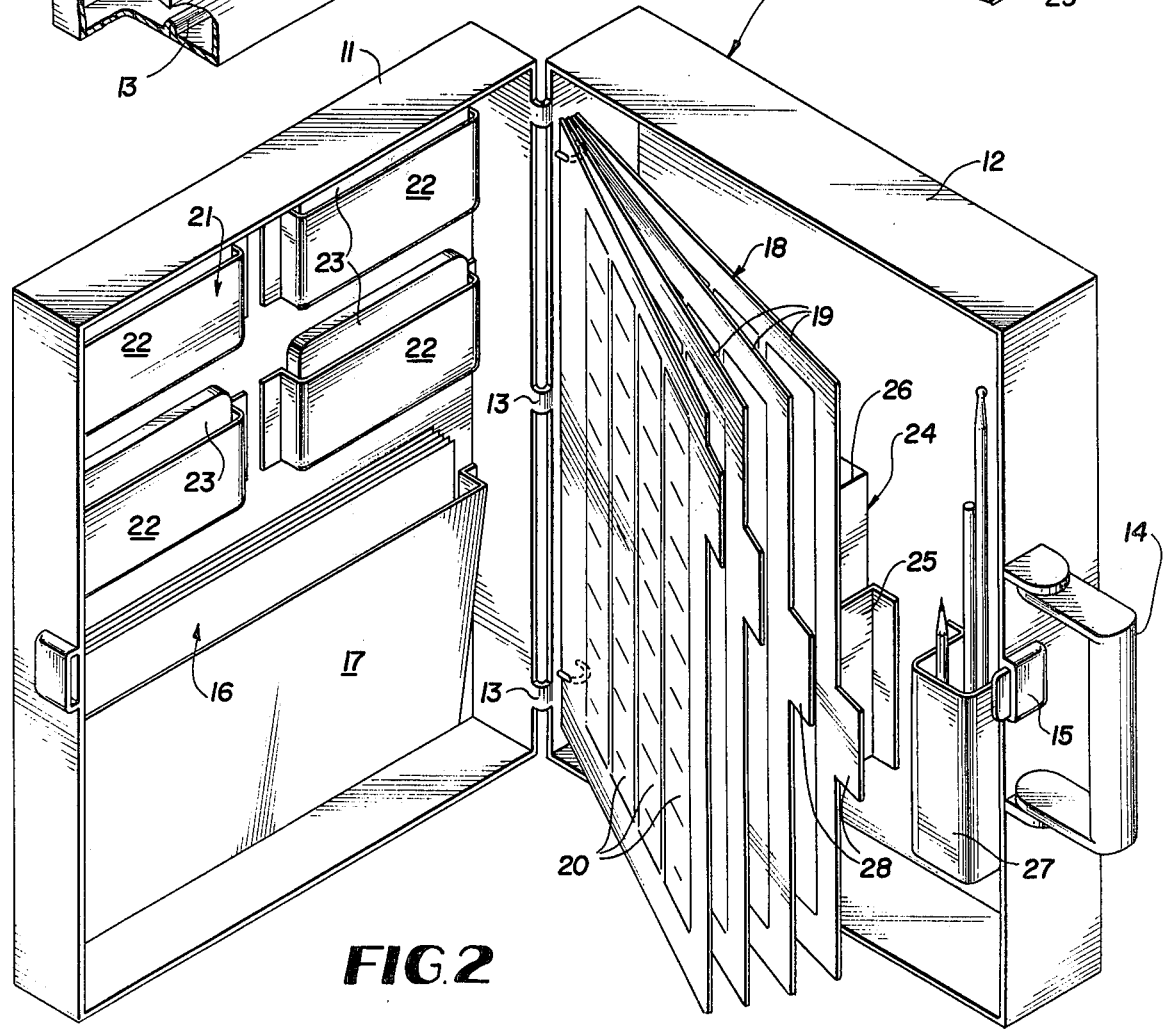

AUDIOVISUAL INTERVIEW PORTFOLIO

BACKGROUND OF THE INVENTION

Ever-increasing competition for employment in the field of education and in many other professional areas has stimulated the need for a more efficient and informative approach to job interviews. Traditionally, professional job applicants in the teaching field and elsewhere prepare a brief written resume of their past professional experience, education, special training, extracurricular activities, publications, and frequently a photograph of the applicant. Such resumes have only limited value in introducing the hopeful job candidate to a potential employer. The resume does little or nothing to highlight the real competencies of the candidate or demonstrate performance skills. Hopefully, these factors can be brought forth during a subsequent job interview with the potential employer. However, under the pressures inherent in such an interview, and in the very limited time usually allowed for the interview, the candidate, unless very skilled in interview procedure, generally falls far short of adequately demonstrating his or her skills and competencies in a given professional field.

Therefore, the present invention directs itself to completely satisfying the above-stated need for a means of adequately reflecting the background and the abilities of a professional job candidate, in lieu of or in addition to the traditional personal resume and subsequent oral interview. The means of accomplishing the above in accordance with the invention is embodied in a relatively simplified, orderly and well thought out portfolio which contains necessary writings in notebook form, viewing slides for a narrative program, audio cassette tapes and videotapes, all pertaining to the job candidate, whether a prospective teacher, artist, actor or other professional. While the invention is keyed to the needs of teachers and advanced student teachers in various disciplines, such as education and communication arts, it is equally useful in many other fields.

The portfolio is made up as a convenient unit which includes a protective carrying case for its components, enabling it to be taken by the job applicant to an interview for demonstration purposes, or to be delivered to the prospective employer when it is impossible or impractical for the candidate to appear. In either case, the audiovisual portfolio is far more effective in demonstrating the unique personal capabilities of the job candidate than the traditional procedure of a brief written resume and following interview, usually without proper planning, rehearsal, and the bringing together of truly representative materials reflective of job skills and competencies.

While the known prior art contains various teachings relating to personal compartmentalized carrying cases for a variety of articles and purposes, no known prior art device suggests the concept embodied in this invention or the capabilities and purposes of the invention set forth above.

To comply with the requirements under 37 C.F.R. 1.56, the following prior United States patents of some general interest only are made of record herein: 3,133,631, 3,823,491, 3,376,962, 3,823,814, 3,583,729, 3,829,132, 3,968,573.

BRIEF DESCRIPTION OF THE DRAWINGS

FIG. 1 is a perspective view of an audiovisual interview portfolio according to the invention with the carrying case thereof closed.

FIG. 2 is a perspective view of the portfolio in an open state.

FIG. 3 is a fragmentary perspective view of one side of the portfolio.

DETAILED DESCRIPTION

Referring to the drawings in detail wherein like numerals designate like parts, an audiovisual portfolio for the professional job candidate or the like comprises a rectangular carrying case 10 which may be constructed from any convenient material, such as plastic, wood or metal, with a suitable covering. For illustration purposes, a plastic case has been shown having two opposing box-like sections 11 and 12 joined along corresponding edges by a living hinge 13. The case 10 has a carrying handle 14 and a suitable latch 15 of any conventional type. As shown in the drawings, the two sections 11 and 12 of the carrying case 10 are comparatively deep, with the section 12 being somewhat deeper than the section 11 which constitutes the lid of the case. Both sections 11 and 12 are adequately deep to fully enclose the components of the portfolio therein without crushing or crowding them.

The audiovisual portfolio comprises four main components or segments, namely, a notebook component 16 for writings, to be described, the case section 11 having a large pocket 17 built therein to hold the notebook 16; a slide narrative section 18, consisting of several looseleaf type cards or holders 19 for visual slides 20 suitably held on one or both faces of the holders 19; an audio cassette section 21 in the case section 11 above the notebook section and having plural pockets 22 built therein for suitable audio cassette tapes 23; and a videotape section 24 in the case section 12 including a built-in pocket 25 for one or more videotapes 26.

The deeper case section 12 houses the looseleaf slide holders or cards 19 in addition to the videotape 26 and pocket 25 which underlie the slide holders in a compact manner when the case is closed. As shown in FIG. 2, the slide holders or cards 19 are hinged by conventional ring devices to the case section 12, and the cards span the major area encompassed by that case section. There is room enough in the deeper case section 12 for a built-in utility pocket 27 for blackboard pointers, pencils and other small items. Extensions 28 are preferably provided on the slide cards 19 for subject matter labels or other identifying means. A card holder 29 is preferably included on the outside of the case 10 for personal identification data.

The notebook section or component 16 of the portfolio in the case of a prospective teacher will include in the notebook proper held in the pocket 17 a brief autobiography of the prospective teacher or other professional job candidate, lesson plans, statement of philosophy of teaching, class roll and grade book, and samples of teacher-made and/or commercial examinations. The physical nature of the notebook 16 may vary and is unimportant. Its content, however, is very important in demonstrating the competencies of the prospective teacher or other professional.

Among the competencies demonstrated by the notebook 16 are the ability of written self-expression; the ability to plan programs both long and short range as in the teaching profession; the ability to define objectives and to develop learning experiences; the ability to measure the progress of students and to clearly state a teaching philosophy; the ability to record necessary data and to design tests that truly measure a student's achievement level; and the general ability to assemble materials which are necessary and helpful in the practice of the profession. In general, the student teaching notebook 16 includes materials which will readily demonstrate to an interviewer, such as a school principal, the teacher candidate's performance skills. The notebook preferably includes a table of contents.

The slide narrative section 18 of the portfolio contains a large number of viewing slides whose images are projectable by readily available equipment. The purpose of the slide narrative section of the portfolio is to make the interviewer or prospective employer cognizant or specific teaching or professional skills of a given candidate, and social and professional characteristics which are not effectively presented in a simple resume or job interview. Briefly, the slide narrative section of the portfolio is premised on the statement "A picture is worth more than a thousand words".

The types of slides mounted on the holders 19 will typically include a student teacher at home preparing a teaching assignment; student teacher meeting a school principal; student teacher involved in non-teaching pertinent activities during an observation period; student teacher teaching a lesson to a class including working with small groups, operating commonly used educational equipment and the like; student teacher attending parent-teacher-student meetings and conferring with supervisors, participating in various extracurricular activities; and student teacher participating in local and national professional meetings in his or her academic discipline. The above are merely examples taken from many projection slide contents which will reflect the skills of the professional candidate in a given field. The slide narrative program should be accompanied with an audio narrative tape or written narrative to achieve the most beneficial effect.

In the audio cassette section 21 of the portfolio, the audio tapes 23 should contain an introductory lesson, in the case of a student teacher, an audiovisual lesson, a review lesson, developmental lesson and an appreciation lesson. Each audio cassette tape lesson of whatever type should have an introduction including the teacher's name, description of the class, lesson topic and objectives, and evaluation procedures. The tapes in the portfolio should be labeled for ease of selection by a school principal or other potential employer to whom the portfolio may be forwarded.

In the videotape section 24 of the portfolio, the videotape 26 contains a demonstration lesson reflecting abilities and skills of the student teacher, or other capabilities in the case of a different profession. The demonstration lesson should introduce the teacher and the teacher related activities and objectives to student interests and needs. On the videotape, for a given teaching situation, the teacher will vary the stimulus by pausing, using cues, gesturing, focusing on important points, to demonstrate his personal versatility and teaching ability. The exact content of the videotape may vary for different situations and the tape may contain plural sample lessons, such as introductory, review, and appreciation lessons.

The videotape should contain a lesson or lessons performed during student teaching, and like the audio cassette, should include an introduction with the teacher's name, lesson topic, objectives and evaluation procedures. A typewritten lesson plan preferably should be included with the videotape.

It should now be apparent to those skilled in the art that the interview portfolio in one convenient and well organized unit enables a prospective teacher to demonstrate his or her competencies and performance skills in a much more complete and effective manner than is ordinarily possible with the written resume and brief interview. Of course, the present portfolio does not preclude an interview and, preferably, should be taken to the interview by the teacher or other professional seeking employment. Following the interview, the portfolio can be left behind with the school principal or other employer to enable an in-depth study of the candidate. To make this study quite complete, the portfolio in very convenient use form contains demonstration writings of the candidate, a fairly extensive slide series, audio cassettes where the voice and voice techniques of the candidate can be studied, and finally a videotape demonstration of professional skills in teaching or other professional activities, which can be considered the highlight point of the demonstration portfolio.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An interview portfolio for a teacher candidate comprising a rectangular case including two hingedly connected case sections one of which is comparatively deeper than the other, plural comparatively small audiotape pockets within the less deep case section and occupying about one-half of the area thereof, a single large teacher notebook pocket within the last-named case section and occupying approximately the remaining half of the area thereof, a teacher videotape retaining pocket disposed within the deeper case section generally centrally, a pocket for accessories within the deeper case section near one side of the teacher videotape pocket, and a plurality of holder cards for projection slides hingedly held in the deeper case section in covering relationship to the videotape and accessory pockets and forming a divider means between the two case sections, said holder cards extending over the major portion of the area encompassed by the rectangular case sections.

2. An interview portfolio as defined in claim 1, and carrying handle means and latching means on the case distant from the hinge axis for the case sections.

* * * * *